US010491628B2

(12) United States Patent
Kawauchi et al.

(10) Patent No.: US 10,491,628 B2
(45) Date of Patent: Nov. 26, 2019

(54) ATTACK OBSERVATION APPARATUS AND ATTACK OBSERVATION METHOD

(71) Applicant: MITSUBISHI ELECTRIC CORPORATION, Tokyo (JP)

(72) Inventors: Kiyoto Kawauchi, Tokyo (JP); Shoji Sakurai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 279 days.

(21) Appl. No.: 15/509,299

(22) PCT Filed: Sep. 17, 2014

(86) PCT No.: PCT/JP2014/004773
§ 371 (c)(1),
(2) Date: Mar. 7, 2017

(87) PCT Pub. No.: WO2016/042587
PCT Pub. Date: Mar. 24, 2016

(65) Prior Publication Data

US 2017/0302683 A1 Oct. 19, 2017

(51) Int. Cl.
*G06F 21/56* (2013.01)
*H04L 29/06* (2006.01)
*G06F 9/455* (2018.01)

(52) U.S. Cl.
CPC ........ *H04L 63/145* (2013.01); *G06F 9/45533* (2013.01); *H04L 63/1491* (2013.01)

(58) Field of Classification Search
CPC . H04L 63/145; H04L 63/1491; G06F 21/566; G06F 9/45533; G06F 21/53
See application file for complete search history.

(56) References Cited

U.S. PATENT DOCUMENTS 8,331,251 B2 12/2012 Suzuki et al.
8,677,484 B2 3/2014 Munetoh et al.
(Continued)

FOREIGN PATENT DOCUMENTS

JP 2002-111727 A 4/2002
JP 2008-172548 A 7/2008
(Continued)

OTHER PUBLICATIONS

Portokalidis et al: "SweetBait: Zero-hour worm detection and containment using low- and high-interaction honeypots", Jan. 20, 2007 (Jan. 20, 2007), Computer Networks, Elsevier Science Publishers B.V., Amsterdam, NL, vol. 51, No. 5, pp. 1256-1274.*
(Continued)

*Primary Examiner* — Lisa C Lewis
*Assistant Examiner* — Zhimei Zhu
(74) *Attorney, Agent, or Firm* — Birch, Stewart, Kolasch & Birch, LLP

(57) ABSTRACT

The present invention relates to an attack observation apparatus being a simulation environment where a malicious program such as malware created by an attacker is run, the simulation environment being built for observing the behavior and attack scheme of the malicious program.
The attack observation apparatus includes a low-interactive simulation environment to execute on a terminal a predetermined response to communication coming from the malware, a high-interactive simulation environment to execute a response to the communication coming from the malware with using a virtual machine which simulates the terminal, and a communication management part to monitor an execution state of the low-interactive simulation environment with respect to the communication coming from the malware and switch the communication coming from the malware to the
(Continued)

high-interactive simulation environment depending on the execution state of the low-interactive simulation environment.

9 Claims, 16 Drawing Sheets

(56) References Cited

U.S. PATENT DOCUMENTS

| | | | |
|---|---|---|---|
| 8,683,589 B2 | 3/2014 | Munetoh et al. | |
| 9,843,596 B1 * | 12/2017 | Averbuch | H04L 63/1416 |
| 2002/0046351 A1 | 4/2002 | Takemori et al. | |
| 2009/0222779 A1 * | 9/2009 | Nirmaier | G01R 31/318357 716/113 |
| 2010/0118717 A1 | 5/2010 | Suzuki et al. | |
| 2012/0254951 A1 | 10/2012 | Munetoh et al. | |
| 2012/0297452 A1 | 11/2012 | Munetoh et al. | |
| 2014/0357972 A1 * | 12/2014 | Meng | H04W 88/00 600/365 |
| 2015/0112967 A1 * | 4/2015 | Shimizu | G06F 9/4843 707/718 |
| 2015/0248421 A1 * | 9/2015 | Hsiao | G06F 11/1435 707/639 |

FOREIGN PATENT DOCUMENTS

| | | |
|---|---|---|
| JP | 2008-306610 A | 12/2008 |
| JP | 2009-181335 A | 8/2009 |
| JP | 2010-15513 A | 1/2010 |
| JP | 2010-186427 A | 8/2010 |
| JP | 2011-257901 A | 12/2011 |
| JP | 2012-14437 A | 1/2012 |
| JP | 2012-83799 A | 4/2012 |
| JP | 2012-212391 A | 11/2012 |
| JP | 2013-9185 A | 1/2013 |
| JP | 2013-85124 A | 5/2013 |

OTHER PUBLICATIONS

Michael D. Bailey, Evan Cooke, Farnam Jahanian, Niels Provos, Karl Rosaen, and David Watson, "Data Reduction for the Scalable Automated Analysis of Distributed Darknet Traffic", Oct. 2005, Proceedings of the ACM SIGCOMM Conference on Internet Measurement, pp. 239-252.*

Hassan Artail, Haidar Safa, Malek Sraj, Iyad Kuwatly, Zaid Al-Masri, "A hybrid honeypot framework for improving intrusion detection systems in protecting organizational networks", 2006, Computers & Security,vol. 25, Issue 4, pp. 274-288.*

Sanjeev Kumar, Paramdeep Singh, Rakesh Sehgal, and J. S. Bhatia, "Distributed Honeynet System Using Gen III Virtual Honeynet," 2012, International Journal of Computer Theory and Engineering vol. 4, No. 4, pp. 537-541.*

K. Chawda and A. D. Patel, "Dynamic & hybrid honeypot model for scalable network monitoring," 2014, International Conference on Information Communication and Embedded Systems (ICICES2014), Chennai, pp. 1-5.*

Adachi et al., "Malware Analysis System using Process-level Virtualization", Computers and Communications, 2009 ISCC 2009, 2009, pp. 550-556.

Bringer et al., "A Survey: Recent Advances and Future Trends in Honeypot Research", I.J. Computer Network and Information Security, vol. 10, 2012, pp. 63-75.

Kasama et al."Malware Sandbox Analysis System with Accumulated Server Responses Collected by Dummy Clients", International Processing Society of Japan, Anti Malware Engineering Workshop 2009 (MWS2009 A7-2), Oct. 2009, 6 pages.

* cited by examiner

Fig. 4

| TERMINAL ID (401) | COMMUNICATION PROCESSING PROGRAM NAME (402) | FILE SYSTEM NAME (403) | IP ADDRESS (404) | EXECUTION STATE (405) | VLAN ID (406) |
|---|---|---|---|---|---|
| PC1 | PROGRAM #1 | NTFS | 1. 2. 3. 1 | STANDBY | |
| PC2 | PROGRAM #1 | NTFS | 1. 2. 3. 2 | HIGH-INTERACTIVE | vlan2 |
| PC3 | PROGRAM #2 | EXT4 | 1. 2. 3. 3 | LOW-INTERACTIVE | |
| : | : | : | : | : | : |

Fig. 5

| EXECUTION TIME (501) | TERMINAL ID (502) | COMMAND (503) |
|---|---|---|
| 9:00:15 | PC1 | write_file "c:¥test. txt", "abc" |
| 9:30:10 | PC3 | create_file "g:¥doc¥specification. doc" |
| 11:15:10 | PC1 | delete_file "c:¥test. txt" |
| 15:10:11 | PC2 | copy_file "c:¥xxx. xls" "c:¥yyy. xls" |
| : | : | : |

601 602 603 604

| COMMAND NAME | TERMINAL ID | STARTED PROGRAM | USER ID |
|---|---|---|---|
| write_file | PC1 | notepad.exe $1 | alice |
| | PC2 | vi $1 605 | bob |
| | : | : | : |
| read_file | PC1 | notepad.exe $1 | alice |
| : | : | : | : |

| COMMAND NAME | PARAMETER | OUTPUT | MEANING |
|---|---|---|---|
| read_file | FILE NAME | FILE DATA | ACQUIRE CONTENTS OF FILE |
| write_file | FILE NAME, DATA | | WRITE DATA TO FILE |
| copy_file | COPY-SOURCE FILE NAME, COPY-DESTINATION FILE NAME | | COPY FILE |
| create_file | FILE NAME | | CREATE FILE |
| delete_file | FILE NAME | | DELETE FILE |
| : | : | : | : |

ATTACK OBSERVATION APPARATUS AND ATTACK OBSERVATION METHOD

TECHNICAL FIELD

The present invention relates to an attack observation apparatus being a simulation environment where a malicious program such as malware created by an attacker is run, the simulation environment being built for observing the behavior and attack scheme of the malicious program.

BACKGROUND ART

Conventionally, in a simulation network system where a malicious program such as malware created by an attacker is run, the malicious network system being built for observing the behavior and attack scheme of the malicious program, a scheme (to be referred to as simulation environment hereinafter) of simulating a terminal or server which functions in the network system is known. For example, a scheme as described in Patent Literature 1 is known. According to this scheme, simulation is performed by a simulation program which receives communication data as input transmitted from a malware-infected terminal, determines response data in accordance with the contents of the communication data, and sends back the response data. Such a simulation environment will be called a low-interactive honeypot (an example of a low-interactive simulation environment) hereinafter.

A scheme as described in Patent Literature 2 and Non-Patent Literature 1 is also known. According to this scheme, a virtual machine is operated in a virtualized environment that uses a commercially available product, and this virtualized environment is used as a simulation environment. Such a simulation environment will be referred to as a high-interactive honeypot (an example of a high-interactive simulation environment) hereinafter.

CITATION LIST

Patent Literature

Patent Literature 1: JP 2009-181335
Patent Literature 2: JP 2012-212391

Non-Patent Literature

Non-Patent Literature 1: Takahiro Kasama et al, "Malware Sandbox Analysis System with Accumulated Server Responses Collected by Dummy Clients", International Processing Society of Japan, anti Malware engineering Workshop 2009 (MWS2009) A7-2, (October 2009).

SUMMARY OF INVENTION

Technical Problem

In a low-interactive honeypot, each simulated terminal and each server return a response to the contents of a received communication packet, in accordance with a method predetermined by a program. Since it is only necessary to return the determined response to the packet transmitted from malware, advantageous can be obtained that the processing load is small and that large numbers of terminals and servers can be simulated simultaneously. However, a problem exists that when a packet with contents (for example, an unknown attack) that cannot be processed by the program is received, the terminals and servers cannot respond in the same manner as when an actual packet is received. Another problem also arises that in face of an attack accompanying malware infection, it is impossible to run the malware in the simulation environment.

Meanwhile, a high-interactive honeypot can cope with the above-mentioned issue of unknown attack and malware infection. However, a simulation environment that uses high-interactive honeypots requires resources (a CPU, a memory, an HHD, and so on) equivalent to the actual resources for simulating one terminal or one server. When, for example, the entire business system is to be simulated, a large number of terminals and a large number of servers must be prepared.

As described above, in the prior art, a large-scale system cannot be simulated elaborately.

The present invention has been made to solve the above problems, and has as its object to implement an attack observation apparatus capable of elaborate simulation with a few computer resources even in a large-scale network system such as a business system.

Solution to Problem

In order to solve the problems described above, an attack observation apparatus according to the present invention is an attack observation apparatus being an environment where malware is run and an attack of the malware is observed, and includes: a low-interactive simulation environment to execute on a terminal a predetermined response to communication coming from the malware; a high-interactive simulation environment to execute a response to the communication coming from the malware with using a virtual machine which simulates the terminal; and a communication management part to monitor an execution state of the low-interactive simulation environment with respect to the communication coming from the malware and switch the communication coming from the malware to the high-interactive simulation environment depending on the execution state of the low-interactive simulation environment.

Advantageous Effects of Invention

According to the present invention, communication is processed initially by a low-interactive honeypot. Communication is switched to a low-interactive honeypot only where necessary, so that use of the high-interactive honeypot can be reduced. Hence, an effect can be obtained that an attack observation apparatus simulating a large-scale system can be implemented with a few computer resources.

BRIEF DESCRIPTION OF DRAWINGS

FIG. 4 is a diagram illustrating an example of honeypot execution state data stored in a honeypot execution state management part 115.

FIG. 5 is a diagram illustrating an example of a terminal state transition scenario stored in a terminal state transition scenario accumulation part 110.

DESCRIPTION OF EMBODIMENTS

Embodiment 1

Figure 1:
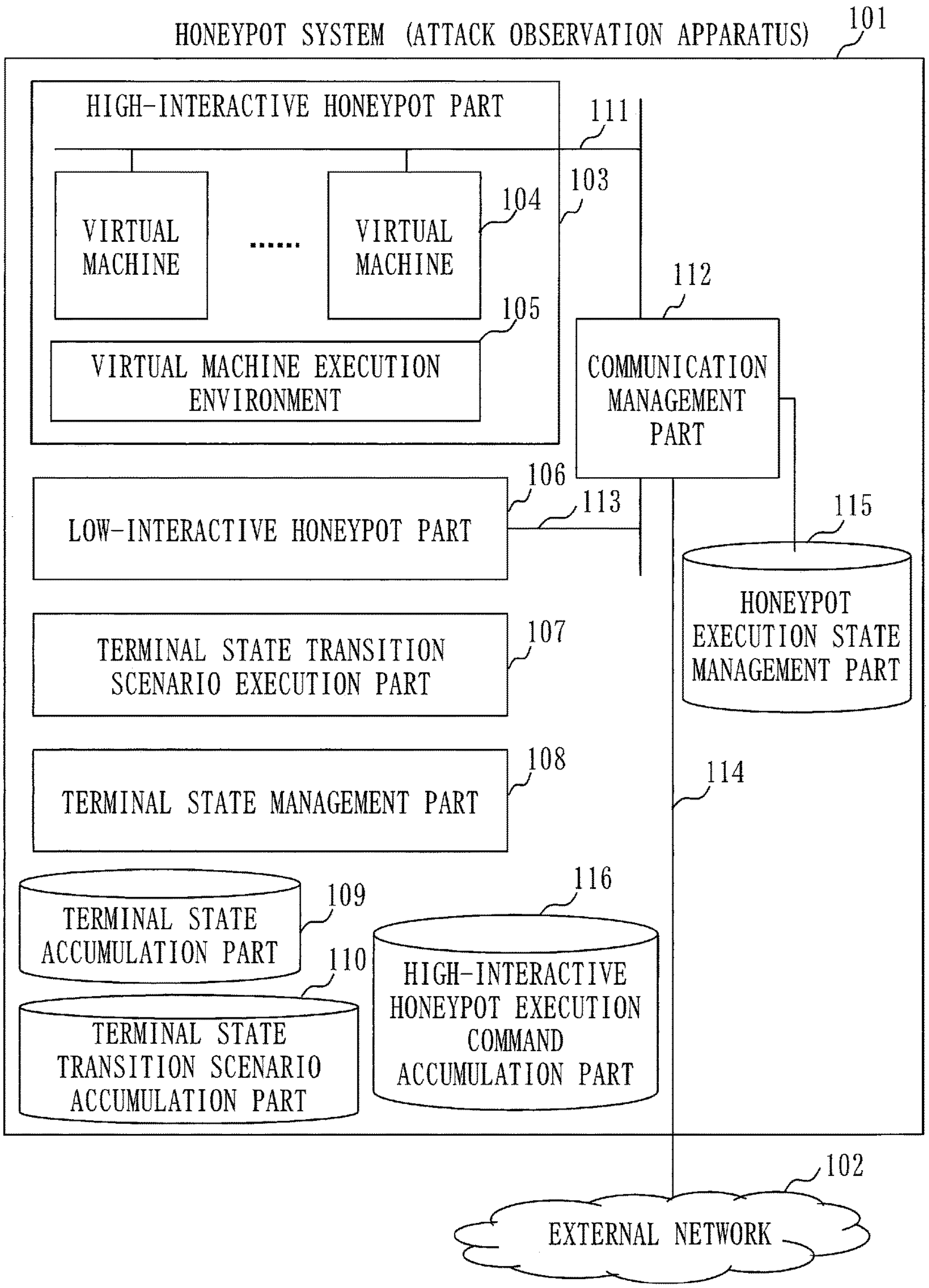
FIG. 1 is a configuration diagram illustrating one configuration example of an attack observation apparatus according to Embodiment 1.

FIG. 1 is a configuration diagram illustrating a configuration example of an attack observation apparatus according to Embodiment 1.

Referring to FIG. 1, a honeypot system 101 being an attack observation apparatus is constituted of a high-interactive honeypot part 103 being a high-interactive simulation environment, a low-interactive honeypot part 106 being a low-interactive simulation environment, a terminal state transition scenario execution part 107, a terminal state management part 108, a terminal state accumulation part 109, a terminal state transition scenario accumulation part 110, a communication management part 112, a honeypot execution state management part 115 being an execution state management part, and a high-interactive honeypot execution command accumulation part 116 being an execution command accumulation part. The high-interactive honeypot part 103 and the low-interactive honeypot part 106 will be collectively called the honeypot hereinafter.

The high-interactive honeypot part 103 houses virtual machines 104 serving as high-interactive honeypots and a virtual machine execution environment 105 which executes the virtual machines 104. The low-interactive honeypot part 106 operates as a low-interactive honeypot. The terminal state transition scenario execution part 107 instructs to the terminal state management part 108 a state change of a file and the like occurring spontaneously in each terminal simulated in the honeypot system 101. The terminal state management part 108 acquires and/or changes the state of the file and the like in each terminal in accordance with a command from the terminal state transition scenario execution part 107 or low-interactive honeypot part 106. The terminal state transition scenario accumulation part 110 accumulates a terminal state transition scenario indicating a scenario for the state transition of each terminal. The communication management part 112 relays and/or manages communication between honeypots, or between the honeypots and an external network 102. The honeypot execution state management part 115 manages honeypot execution state data indicating the present execution state of the honeypots. The high-interactive honeypot execution command accumulation part 116 accumulates a high-interactive honeypot execution command definition table that defines a command and so on started when the terminal state transition scenario is reproduced on the high-interactive honeypot part 103. The communication management part 112 is connected to the virtual machines 104 via a network 111 and connected to the low-interactive honeypot part 106 via a network 113. The communication management part 112 is also connected to the external network 102 via a network 114.

Figure 2:
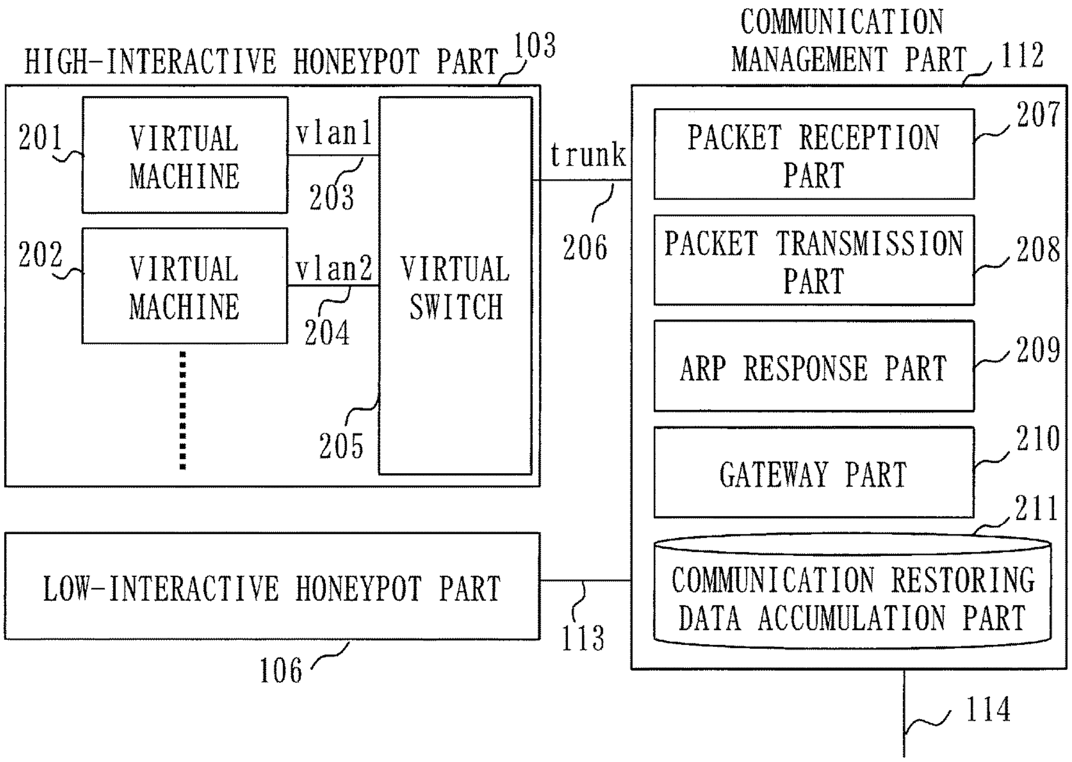
FIG. 2 is a diagram describing configurations of a communication management part 112 and network 111 in detail.

FIG. 2 is a diagram describing configurations of the communication management part 112 and network 111 in detail.

Referring to FIG. 2, the communication management part 112 is constituted of a packet reception part 207 which receives a packet to the communication management part 112, a packet transmission part 208 for transmitting the packet from the communication management part 112, an ARP (Address Resolution Protocol) response part 209 which returns a spoofed response to an ARP, a gateway part 210 which relays communication, and a communication restoring data accumulation part 211 accumulating data necessary for reconstructing a pre-transition communication state on a post-transition simulated terminal in execution state transition of the simulated terminal. The communication management part 112 is connected to the low-interactive honeypot part 106 via a network 113 and connected to the outside of the honeypot system via a network 114.

In FIG. 2, the network 111 of FIG. 1 is constituted of a virtual switch 205 in the high-interactive honeypot part 103, VLANs (Virtual Local Area Networks) 203 to 204 built between respective virtual machines 201 to 202 and the virtual switch 205, and a network 206 which trunk-connects the virtual switch 205 and the communication management part 112.

Figure 3:
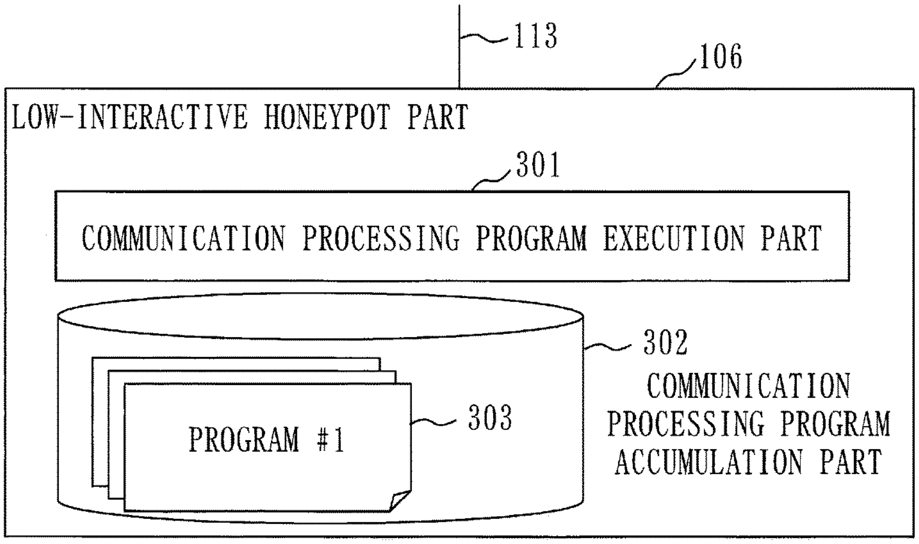
FIG. 3 is a diagram describing a configuration of a low-interactive honeypot part 106 in detail.

FIG. 3 is a diagram describing a configuration of a low-interactive honeypot part 106 in detail.

Referring to FIG. 3, the low-interactive honeypot part 106 is provided with a communication processing program execution part 301 and a communication processing program accumulation part 302. The communication processing program execution part 301 executes a communication processing program which processes common communication protocols such as TCP/IP (Transmission Control Protocol/Internet Protocol) and TLS (Transport Layer Security), and application layer communication. The communication processing program accumulation part 302 stores at least one communication processing program 303. Each communication processing program 303 is identifiable by its program name.

FIG. 4 is a diagram illustrating an example of honeypot execution state data stored in the honeypot execution state management part 115.

Referring to FIG. 4, the honeypot execution state data is constituted of a terminal ID 401, a communication processing program name 402, a file system name 403 an IP address 404, an execution state 405, and a VLAN ID 406.

FIG. 5 is a diagram illustrating an example of the terminal state transition scenario stored in the terminal state transition scenario accumulation part 110.

Referring to FIG. 5, the terminal state transition scenario is constituted of a scenario execution time 501, a terminal ID 502 indicating the ID of a simulated terminal for which a scenario is to be carried out, and a command 503 which is to be carried out for causing a state transition.

Figures 6, 7:
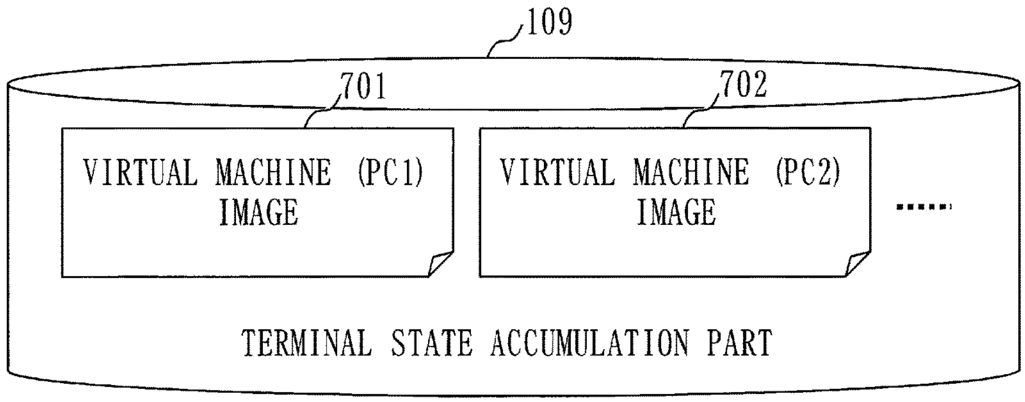
FIG. 6 is a diagram illustrating an example of a high-interactive honeypot execution command definition table stored in a high-interactive honeypot execution command accumulation part 116.
FIG. 7 is a diagram illustrating a configuration example of a terminal state accumulation part 109.

FIG. 6 is a diagram illustrating an example of the high-interactive honeypot execution command definition table stored in the high-interactive honeypot execution command accumulation part 116.

Referring to FIG. 6, the high-interactive honeypot execution command definition table is constituted of a command name 601, a terminal ID 602 of a terminal for which a command is to be carried out, a started program 603 started when carrying out a command, and a user ID 604 of a user having a user privilege for carrying out an operation. As indicated by 605, it is possible to specify for the started program 603 a variable ($1 in the case of FIG. 6) that looks up an argument given to the command of the started program 603.

FIG. 7 is a diagram illustrating a configuration example of the terminal state accumulation part 109.

Referring to FIG. 7, virtual machine images 701 to 702 of the respective simulated terminals are housed in the terminal state accumulation part 109. A virtual machine image stores as a file the image of the file system of a corresponding simulated terminal. This method of storing the image of a file system, as a file can be implemented easily by, for example, reading the sectors in the HDD sequentially and storing them in a file, as with a dd command of a basic OS, for example.

The operation of the attack observation apparatus according to Embodiment 1 will be described.

First, the outline of the overall operation will be described. A terminal simulated in the honeypot system 101 according to Embodiment 1 transitions between two execution states, namely, a low-interactive honeypot state and a high-interactive honeypot state.

When communication addressed to a target terminal to be simulated in this system occurs, the communication management part 112 relays communication data to the low-interactive honeypot part 106 or to the virtual machines 104 in the high-interactive honeypot part 103 depending on the execution state of the target terminal.

The low-interactive honeypot part 106 returns a response to the transmitted communication data in accordance with the communication processing program 303. If the communication processing program 303 determines that switching to a high-interactive honeypot is necessary because, for example, communication for which a processing method is not defined has arrived, then a virtual machine that simulates the address terminal is booted in the high-interactive honeypot part 103, and the execution state of the addressed terminal transitions to the high-interactive honeypot state. Subsequent communication is transferred to the virtual machine by the communication management part 112.

The terminal state transition scenario execution part 107 carries out the spontaneous state change in each simulated terminal in accordance with the scenario by operating the terminal state management part 108. A spontaneous state change signifies a state change occurring irrespective of the communication to the simulated terminal, that is, a file change. The purpose of the spontaneous state change is to make the state look as if an authorized user were acting on the simulated terminal.

The operation in detail of each part of the attack observation apparatus will now be described. To begin with, the operation of the communication management part 112 will be described with referring to FIG. 8.

Figure 8:
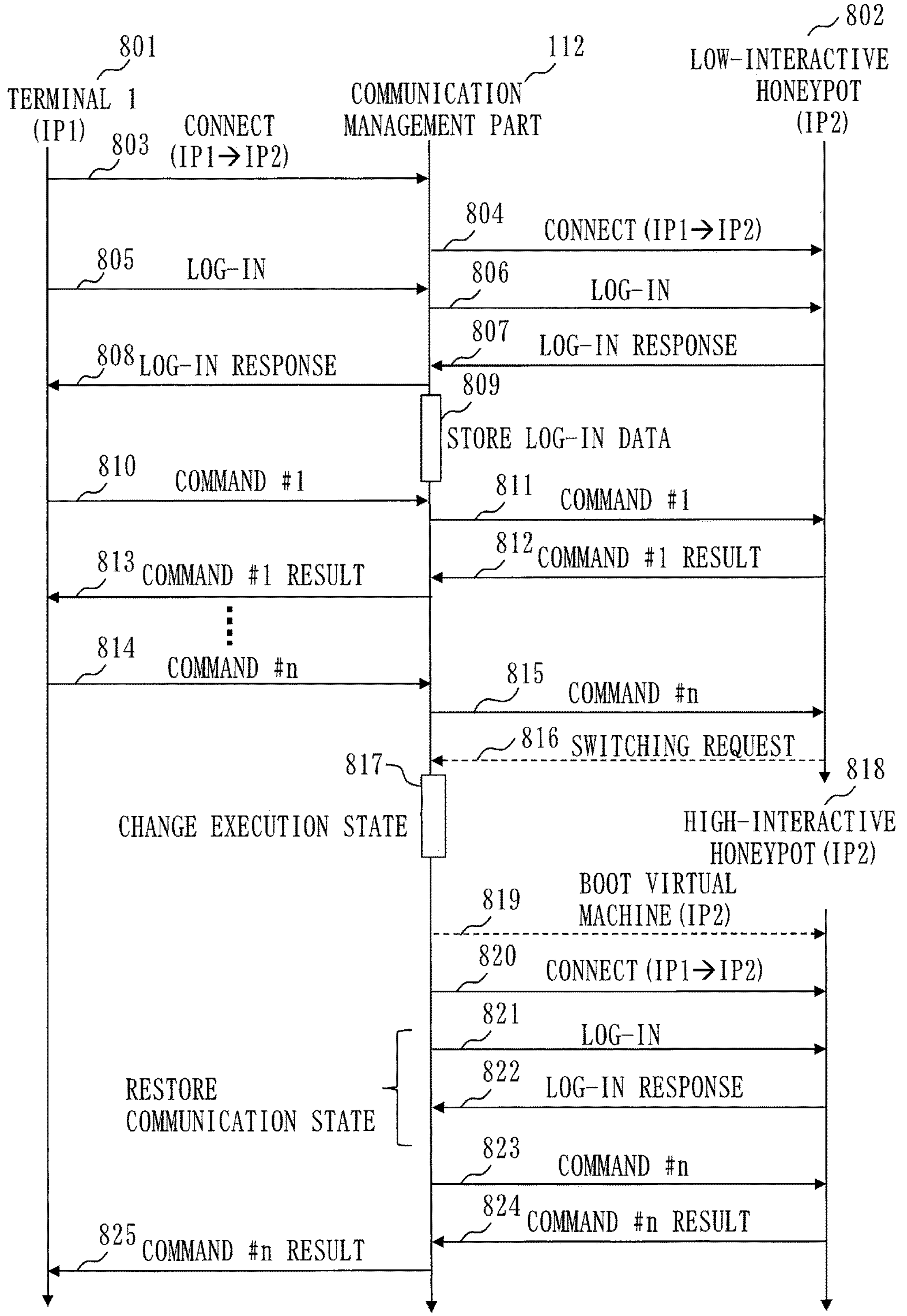
FIG. 8 is a sequence diagram illustrating communication the communication management part 112 carries out with other terminals and a process executed in the communication management part 112.

FIG. 8 is a sequence diagram illustrating communication the communication management part 112 carries out with other terminals and a process executed in the communication management part 112.

Referring to FIG. 8, first, when a terminal 1 (801) is to communicate with a simulated terminal (having an IP address of IP2), the terminal 1 transmits a connection request to IP2 (803) as a destination. The connection request is received by the packet reception part 207 of the communication management part 112 and supplied to the gateway part 210. The gateway part 210 establishes the connection with the sender. Honeypot execution state data (FIG. 4) in the honeypot execution state management part 115 is searched for with using the destination IP address as a key. When it is confirmed that the terminal 1 is a simulated terminal, the communication management part 112 sends a connection request, and the connection is established (804). Namely, connection from a terminal to another terminal is terminated by the gateway part 210 in the communication management part 112, providing two connections. Not only a TCP but also a session such as a TLS (Transport Layer Security), which is built by a higher-level protocol is terminated by the communication management part 112.

After that, the terminal 1 (801) and a low-interactive honeypot (802) communicate with each other as the communication is being relayed by the communication management part 112 (805 to 815). The communication management part 112, while relaying the communication, monitors the communication state change of the application layer of the communication it relays, and stores in the communication restoring data accumulation part 211 the communication of when a state transition occurs.

Figure 9:
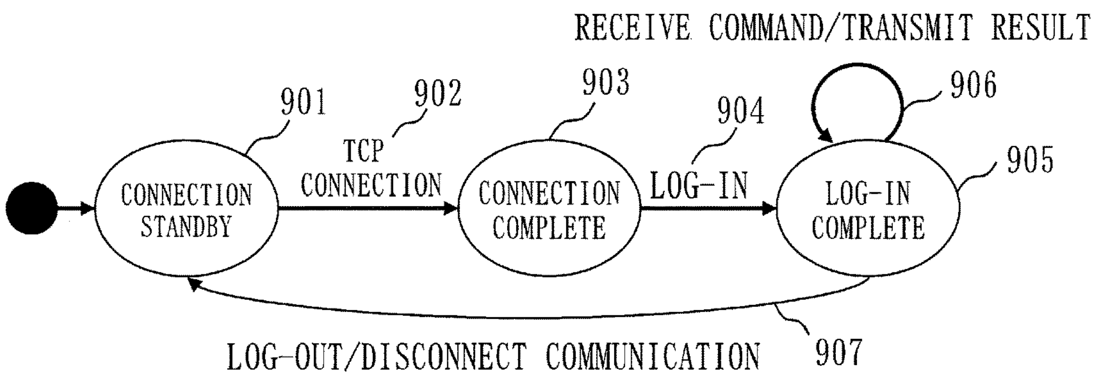
FIG. 9 is a diagram illustrating an example of a state transition of a communication protocol.

For example, suppose that the communication illustrated in FIG. 8 relays an application layer which that causes a state transition as indicated by the state transition diagram illustrated in FIG. 9.

FIG. 9 is a diagram illustrating an example of a state transition of a communication protocol.

In the case of the state transition of FIG. 9, it is seen that at the time a log-in (904) communication occurs, the communication state transitions from connection complete (903) to log-in complete (905). Therefore, after log-in is successful at 808, log-in data is stored in the communication restoring data accumulation part 211 at 809. A command relayed after the log-in will not be stored in the communication restoring data accumulation part 211 because this command corresponds to transition of 906 in FIG. 9 and does not cause a state transition.

Subsequently, communication with a command #n is transferred to the low-interactive honeypot 802 at 815, and after that a switching request 816 for a honeypot is sent from the low-interactive honeypot 802. Then, the communication management part 112 changes the execution state of the simulated terminal in the honeypot execution state data (FIG. 4) in the honeypot execution state management part 115 to the high-interactive honeypot state (817). The communication management part 112 boots a new virtual machine in the high-interactive honeypot part 103 and connects the high-interactive honeypot part 103 to a virtual switch with using a VLAN independent of the other virtual machines (819).

After that, the communication management part 112 connects to the booted virtual machine (820). In order to restore the communication state to the state of communication that has been carried out between the low-interactive honeypot 802 and the terminal 1 (801) until immediately recently, the communication management part 112 transmits a log-in request (821) with using the log-in data which has been stored in the communication restoring data accumulation part 211, and receives a log-in response (822). Note that communication state restoration of 821 to 822 is to restore the communication state of immediately before switching the honeypot and accordingly does not deal with a command #1 to a command "n−1 as a restoration target. Then, the communication management part 112 transmits a command #n (823) that has been transmitted to the low-interactive honeypot 802 the last time, and transfers (825) a command #n result (824) being a response to the command #n (823), to the terminal 1 (801).

A proxy server and the like are known as examples of an apparatus arranged between two terminals, for building separate connections to the two terminals respectively and transferring data between the two connections in this manner. Embodiment 1 is different from such a known embodiment in the following respect. Namely, the communication management part 112 in Embodiment 1 spoofs an IP address so that none of the two terminals can identify the communication management part 112 as being a communication party. This operation is implemented when, at the start of communication with each simulated terminal, the ARP response part 209 of the communication management part 112 returns the MAC (Media Access Control) address of the communication management part 112 for an ARP (Address Resolution Protocol) request from the communication terminal to broadcast the MAC address of the communication party.

In Embodiment 1, the packet transmission part 208 of the communication management part 112 must determine on which network a packet should be supplied. For this purpose, the packet transmission part 208 looks up the honeypot execution state data stored in the honeypot execution state management part 115 to check the execution state of a simulated terminal corresponding to the destination IP. If the execution state is low-interactive, the packet transmission part 208 transmits the packet onto a network (113 in the case of FIG. 2) connected to the low-interactive honeypot 802. If the execution state is high-interactive, the packet transmission part 208 acquires a VLAN ID of the VLAN to which the simulated terminal is connected. The packet transmission part 208 stores the VLAN ID in an L2 frame (tag VLAN) as a tag and transmits the packet, so that the packet arrives at the corresponding VLAN.

The operation of the low-interactive honeypot 802 will be described with referring to FIG. 10.

Figure 10:
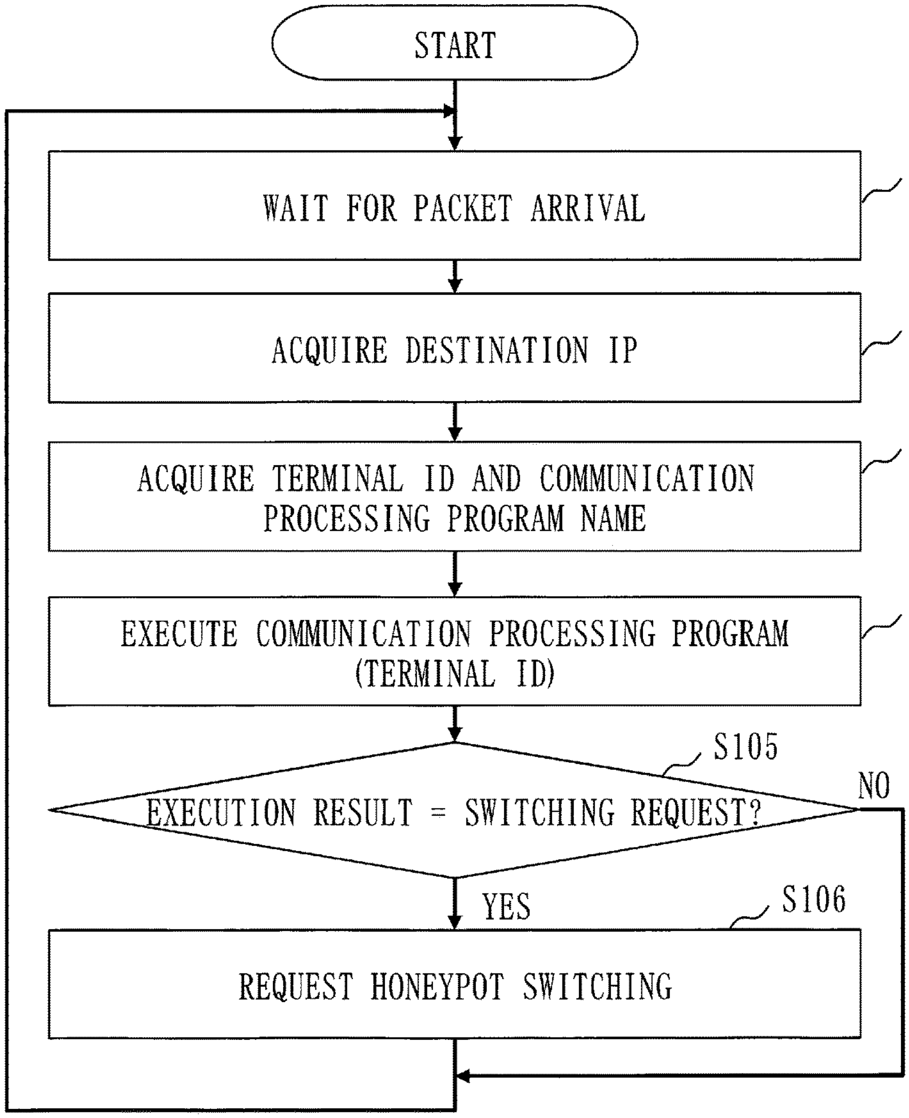
FIG. 10 is a flowchart illustrating an operation flow of a low-interactive honeypot 802.

FIG. 10 is a flowchart illustrating an operation flow of the low-interactive honeypot 802.

First, in step S101, the low-interactive honeypot 802 waits for a packet to arrive.

Then, in step S102, when a packet arrives at the low-interactive honeypot 802, the low-interactive honeypot 802 acquires a destination IP.

Then, in step S103, the low-interactive honeypot 802 searches for honeypot execution state data stored in the honeypot execution state management part 115 with using the acquired destination IP as a key, and acquires a terminal ID and a communication processing program name which are registered in the honeypot execution state data.

Then, in step S104, the low-interactive honeypot 802 executes the communication processing program 303 by giving the acquired terminal ID to the communication processing program 303 as a parameter.

Figure 11:
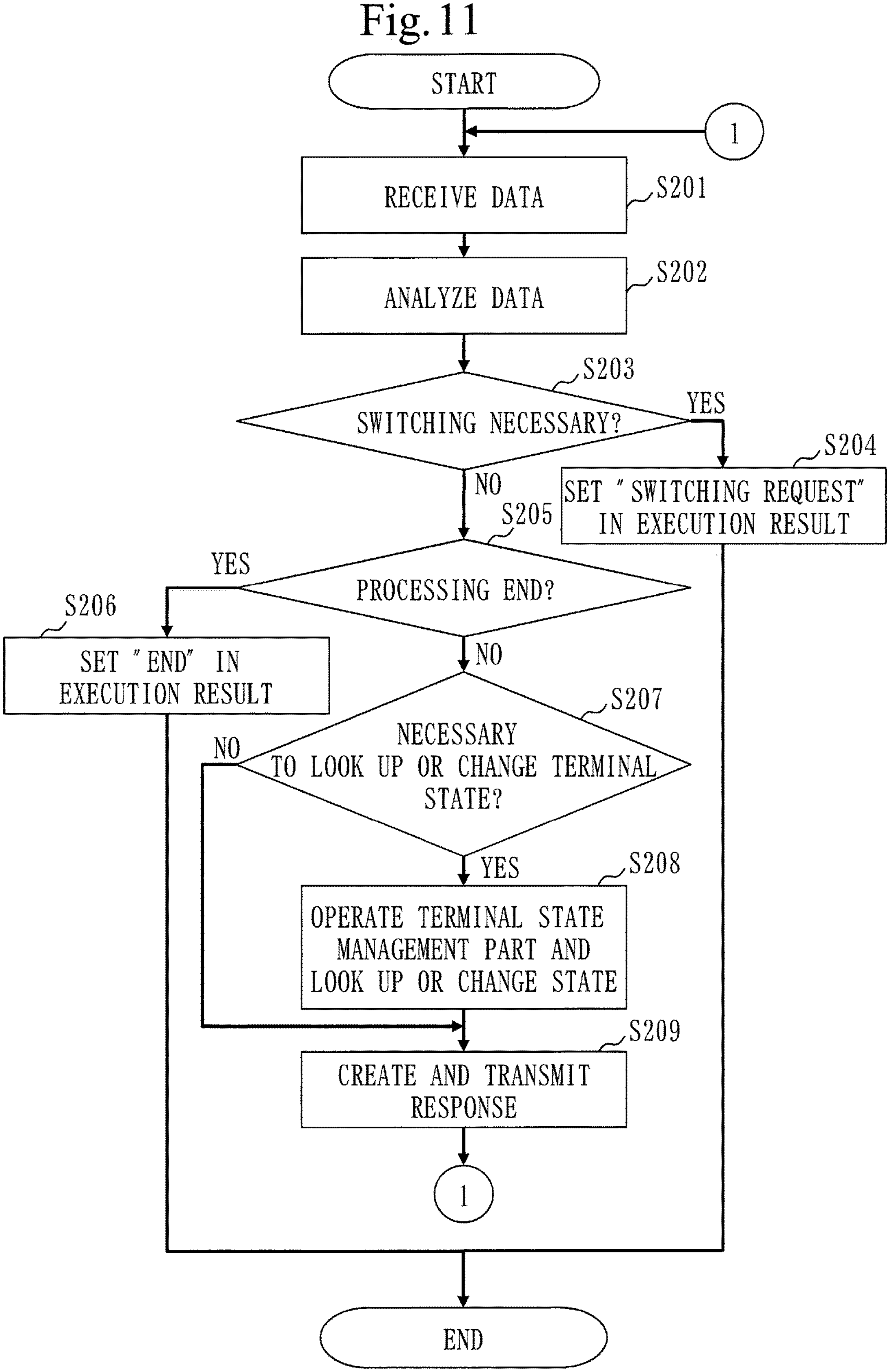
FIG. 11 is a flowchart illustrating an operation flow in a communication processing program 303.

The process in the communication processing program 303 changes when seen in detail depending on the protocol simulated by the communication processing program 303, and flows as illustrated by the flowchart of FIG. 11.

FIG. 11 is a flowchart illustrating an operation flow in the communication processing program 303.

First, in step S201, the communication processing program 303 receives the data of the arriving packet, from the communication processing program execution part 301.

Then, in step S202, the communication processing program 303 analyzes the received data and determines whether a response should be returned, the process should be ended, or switching to a high-interactive honeypot should be made Then, in step S203, if the result of the data analysis by the communication processing program 303 in step S202 indicates that switching to a high-interactive honeypot is needed, the flow branches to step S204 and "switching request" is set in the execution result. The program ends.

Then, in step S205, if it is determined to end the process based on the result of the data analysis by the communication processing program 303 in step S202, the flow branches to step S206 and "end" is set in the execution result. The program ends. If the result of the data analysis in step S202 indicates that a response should be returned, the flow branches to step S207.

Then, in step S207, the communication processing program 303 checks whether or not look-up or change of the terminal state is necessary in creating a response to the received data. Such a need arises when, for example, the contents of some file in the simulated terminal need be stored in the response, or when the received data is a command requesting change of some file. If it is determined that look-up or change of the terminal state is necessary, the flow branches to step S208. The communication processing program 303 calls the terminal state management part 108 with using the terminal ID and command as a parameter, and carries out necessary look-up or change.

Finally, in step S209, the communication processing program 303 creates response data and transmits the response data to the communication management part 112. The transmitted data is transferred to a destination terminal via the gateway part 210 of the communication management part 112. After that, the communication processing program 303 returns to step S201 and waits for the next data to arrive.

When the communication processing program ends, the process returns to step S105 of FIG. 10.

In step S105, the low-interactive honeypot 802 checks the execution result of the communication processing program. If the execution result indicates "switching request", the flow branches to step S106 and the low-interactive honeypot 802 notifies the communication management part 112 of a honeypot switching request. After that, the low-interactive honeypot 802 returns to step S101.

The operation of the terminal state management part 108 will be described with referring to FIG. 12.

Figures 12, 13:
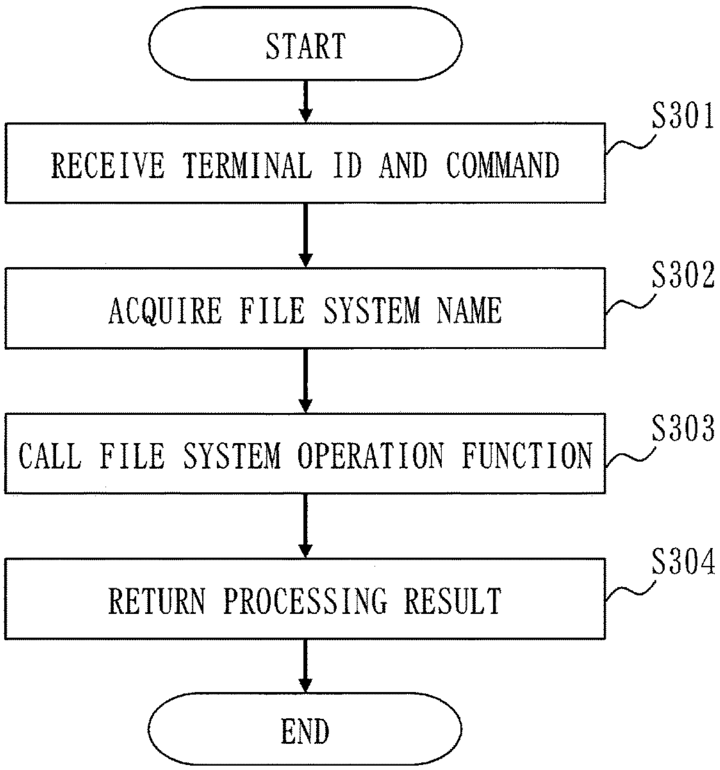
FIG. 12 is a flowchart illustrating an operation flow of a terminal state management part 108.
FIG. 13 is a diagram illustrating examples of a command that can be executed by a communication management part 112.

FIG. 12 is a flowchart illustrating an operation flow of the terminal state management part 108.

First, in step S301, the terminal state management part 108 receives the terminal ID and the command.

Then, in step S302, the terminal state management part 108 acquires a file system name stored in the honeypot execution state management part 115 with using the received terminal ID as a key.

Then, in step S303, based on the acquired file system name, the terminal state management part 108 selects a function for executing a command given on a virtual machine image where the file system is stored. Such a function can be created by using a technique applied to a command such as mount command of the basic OS, which renders a file operable as a virtual file system.

In Embodiment 1, the function is implemented in the terminal state management part 108 as a function. It is also possible to divide the function into modules and switch a module to be loaded, with referring to the file system name.

An example of a command executable by the communication management part 112 in Embodiment 1 will be described.

FIG. 13 is a diagram illustrating examples of the command that can be executed by the communication management part 112.

As illustrated in FIG. 13, some command requires a parameter such as a file name being the operation target. In that case, a command name and a required parameter make up one complete command. Note that the command executable by the communication management part 112 is not limited to the examples illustrated in FIG. 13.

Finally, in step S304, the terminal state management part 108 returns the processing result obtained by executing the function, to the caller. The process ends.

The process of the terminal state transition scenario execution part 107 will be described with referring to FIG. 14.

Figure 14:
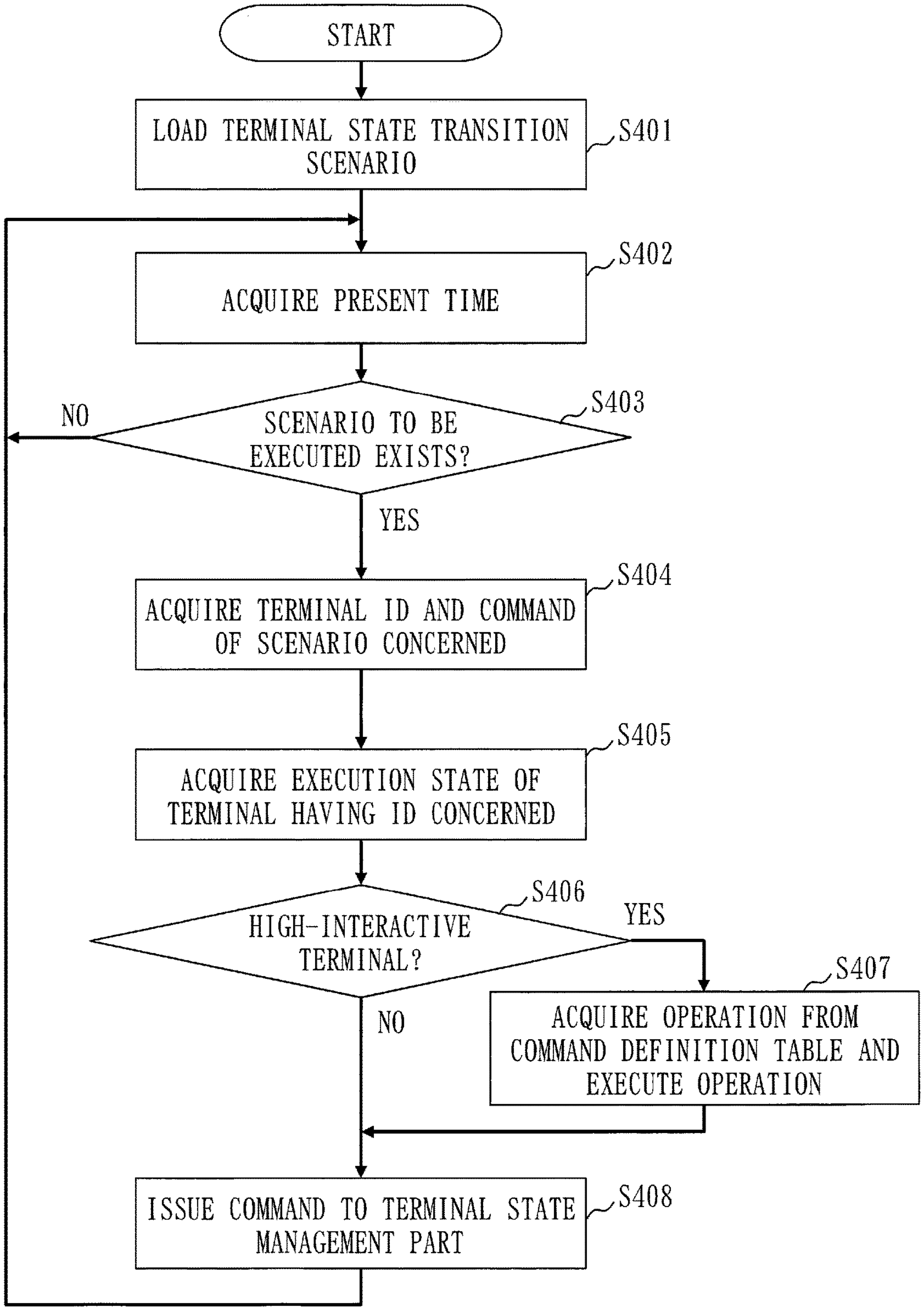
FIG. 14 is a flowchart illustrating an operation flow of a terminal state transition scenario execution part 107.

FIG. 14 is a flowchart illustrating an operation flow of the terminal state transition scenario execution part 107.

First, in step S401, when booting the system, the terminal state transition scenario execution part 107 loads the terminal state transition scenario from the terminal state transition scenario accumulation part 110. The terminal state transition scenario is formed in a table format including, as elements, the execution time 501, the terminal ID 502, and the command 503, as in FIG. 5.

Then, in step S402, the terminal state transition scenario execution part 107 acquires the present time.

Then, in step S403, the terminal state transition scenario execution part 107 checks if the terminal state transition scenario includes a scenario to be executed describing the execution time 501 coinciding with the time acquired in step S402. If such a scenario does not exist, the flow returns to step S402.

Then, in step S404, the terminal state transition scenario execution part 107 acquires the terminal ID 502 and command 503 of the scenario concerned.

Then, in step S405, the terminal state transition scenario execution part 107 searches the execution state management part 115 with using the acquired terminal ID as a key, and acquires the execution state of the terminal having the ID concerned.

Then, in step S406, the terminal state transition scenario execution part 107 checks if the execution state of the simulated terminal indicated by the acquired terminal ID shows a high-interactive honeypot. If the execution state shows a high-interactive honeypot, the flow branches to step S407.

Then, in step S407, the terminal state transition scenario execution part 107 searches the high-interactive honeypot execution command definition table (FIG. 6) stored in the high-interactive honeypot execution command accumulation part 116 with using the command name and terminal ID as a key, and acquires the started program 603 and the user ID 604 that correspond to an operation. The name of the program started on the virtual machine, and an argument which is given at start-up are described in the started program 603. In FIG. 6, a portion $1 expresses a variable indicating the first value of parameters included in the command. The acquired started program 603 is started on the virtual machine concerned, under the privilege of the acquired user ID. Such start-up of a program in the virtual machine is a function provided by an existing product of the virtual machine execution environment as well and is easy to implement.

Finally, in step S408, the terminal state transition scenario execution part 107 supplies the terminal ID and the command acquired from the scenario to the terminal state management part 108. The flow returns to step S402.

As described above, in the invention of Embodiment 1, the communication management part 112 switches the transfer destination honeypot. The communication is initially processed by a low-interactive honeypot. The transfer destination honeypot is switched to a high-interactive honeypot only where necessary, so that use of the high-interactive honeypot can be suppressed. This provides an effect that an attack observation apparatus which simulates a large-scale system can be implemented with a few computer resources.

Regarding the terminal state stored in the terminal state accumulation part 109, the image file of the virtual machine is employed, and the image file is operated by the terminal state management part 108. As a result, the execution state of the low-interactive honeypot and the execution state of the high-interactive honeypot can be synchronized.

The protocol state transition of the application layer is traced by the communication management part 112. Data necessary for state restoration is accumulated. When switching the honeypot, communication for communication state restoration is performed. As a result, honeypot switching can be carried out without causing communication state inconsistency and so on.

Since the communication is terminated in the communication management part 112, honeypot switching can be carried out even with communication using a protocol such as TCP or TLS.

The communication management part 112 returns an ARP response to an ARP request for all simulated terminal IPs. Furthermore, the virtual machines are connected to different VLANs and are booted. This can guarantee that all communications pass by way of the communication management part 112.

The terminal state is changed in accordance with the terminal state transition scenario. Therefore, it is possible to reproduce a state showing as if the user was actually conducting business within the simulated terminal.

When having the high-interactive honeypot carry out state transition according to the terminal state transition scenario, a process is started in the virtual machine. This further enables camouflaging a user conducting business.

Embodiment 2

In Embodiment 1 described above, the communication management part 112 transfers communication to the low-interactive honeypot and the high-interactive honeypot. In Embodiment 2, a case will be described where the low-interactive honeypot is operated by the gateway part 210 of the communication management part 112.

Figure 15:
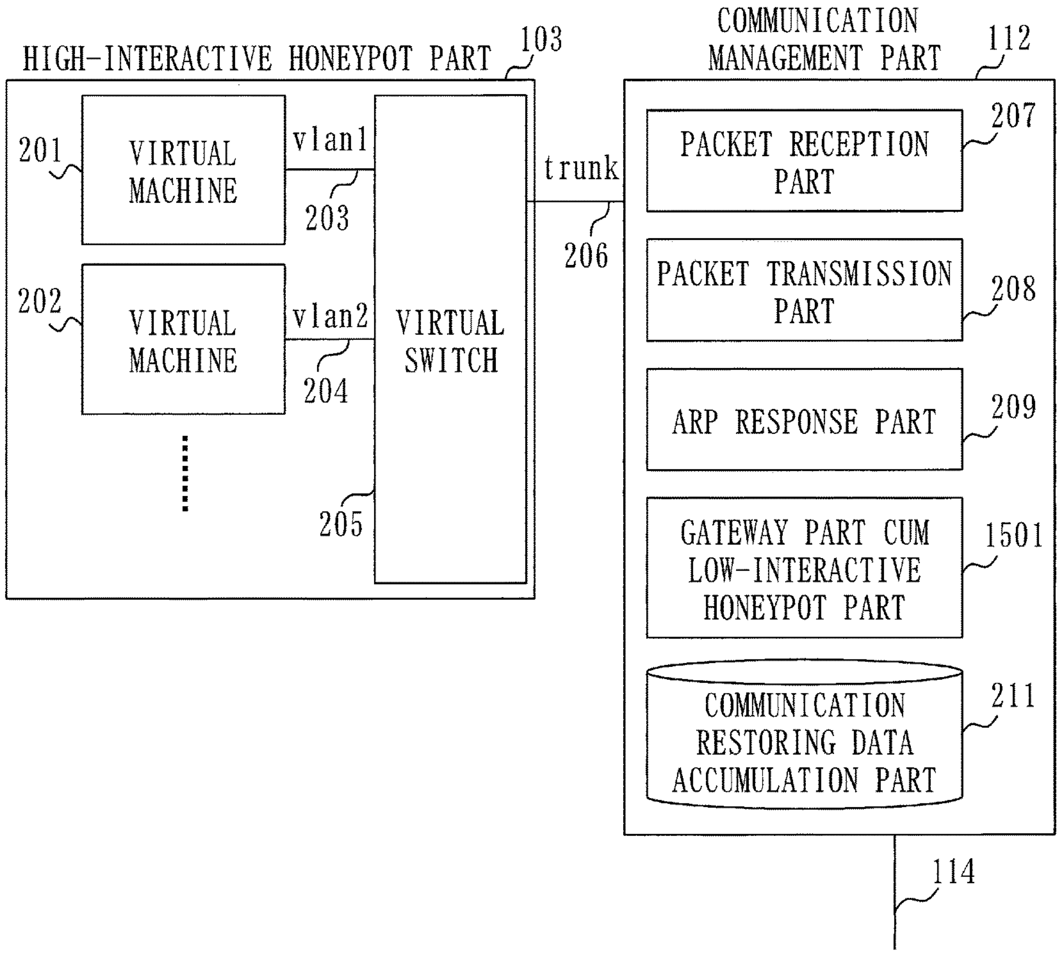
FIG. 15 is a diagram illustrating an example of a system configuration of a periphery of a communication management part 112 according to Embodiment 2.

FIG. 15 is a diagram illustrating an example of a system configuration of a periphery of a communication management part 112 according to Embodiment 2.

Comparison of FIG. 15 with FIG. 2 shows that the low-interactive honeypot part 106 is no longer used. Instead, a gateway part cum low-interactive honeypot part 1501 replaces the gateway part 210.

An operation of the gateway part cum low-interactive honeypot part 1501 in Embodiment 2 will be described. Upon reception of communication from a terminal, the gateway part cum low-interactive honeypot part 1501 processes the communication by a low-interactive honeypot part while storing communication restoring data in the same manner as the gateway part 210 of Embodiment 1 does. This process can be implemented easily by inputting the data to a communication processing program 303 disclosed in Embodiment 1, instead of transferring communication on the gateway part 210 of Embodiment 1. When the communication processing program 303 returns a honeypot switching request, a high-interactive honeypot is booted and the communication state is restored in accordance with the same method as that in Embodiment 1. Subsequently, the communication is transferred to the high-interactive honeypot which has started the communication, in the same manner as in Embodiment 1.

As described above, in the invention of Embodiment 2, since the process of the low-interactive honeypot is carried out on the communication management part 112, overhead of transferring communication to the low-interactive honeypot is eliminated, providing an effect of reducing response delay of communication.

Embodiment 3

In Embodiments 1 and 2 described above, the virtual machines in the high-interactive honeypot part 103 are connected to different VLANs respectively. In Embodiment 3, a case will be described where the same effect is obtained without using VLANs but by setting ARP caches of the respective virtual machines on the communication management part 112.

Figure 16:
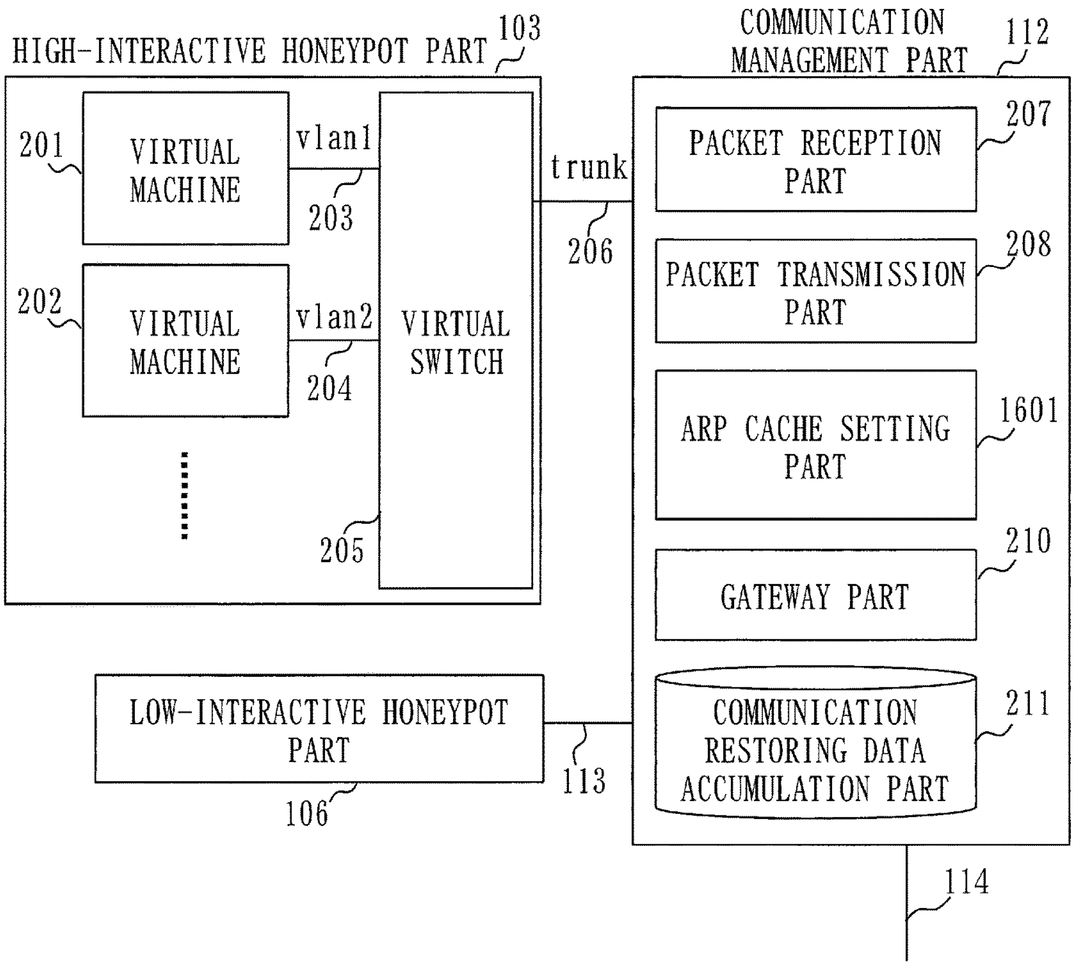
FIG. 16 is a diagram illustrating an example of a system configuration of a periphery of a communication management part 112 according to Embodiment 3.

FIG. 16 is a diagram illustrating an example of a system configuration of a periphery of a communication management part 112 according to Embodiment 3. Comparison of FIG. 16 with FIG. 2 shows that virtual machines 201 and 202 and the communication management part 112 are connected to the same LAN. A configuration being the ARP response part 209 in the communication management part 112 of Embodiment 1 is replaced by an ARP cache setting part 1601.

An operation of the communication management part 112 in Embodiment 3 will be described. In Embodiment 3, the communication management part 112 periodically transmits an ARP response packet to each virtual machine in operation, the ARP response packet indicating that a MAC address corresponding to the IPs of all simulated terminals is the MAC address assigned to the interface of the communication management part 112 connected to a network 206.

Figure 17:
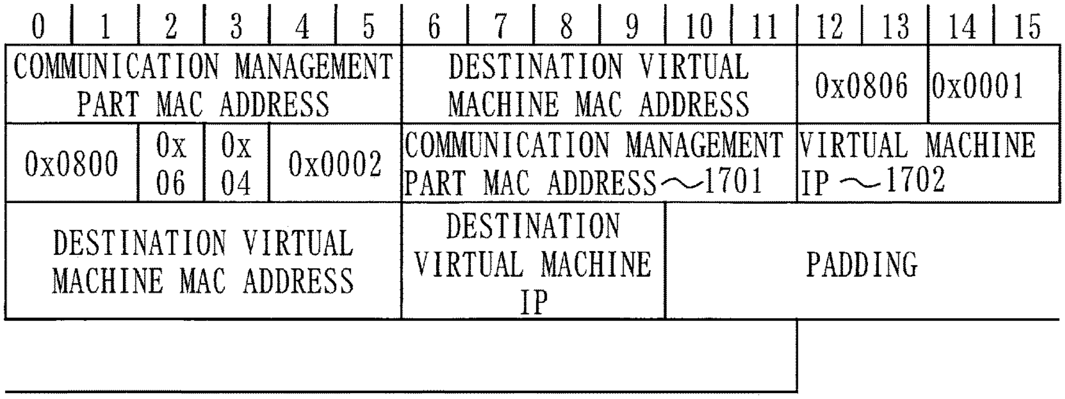
FIG. 17 is a diagram illustrating an example of an ARP response packet.

FIG. 17 is a diagram illustrating an example of the ARP response packet.

As illustrated in FIG. 17, in the packet, the MAC address of the communication management part 112 is used as the MAC address (1701) for each virtual machine IP (1702). Therefore, even when the communication party is an adjacent virtual machine, each virtual machine does not transmit communication directly to the adjacent virtual machine but transmits the packet to the communication management part 112.

As described above, in the invention of Embodiment 3, an ARP response being spoofed is transmitted to each virtual machine. Thereby, the individual virtual machines need not be separated apart by VLANs, providing an effect of simplifying the system configuration.

The scheme disclosed in Embodiment 3 can be applied not only to Embodiment 1 but also to Embodiment 2 similarly, as a matter of course.

Embodiment 4

In Embodiments 1 to 3 described above, all pieces of data necessary for communication state restoration are stored in the communication management part 112. In case of communication state restoration, the communication management part 112 communicates with a booted virtual machine. In Embodiment 4, a case will be described where a low-interactive honeypot is used for communication state restoration of an application layer.

Figure 18:
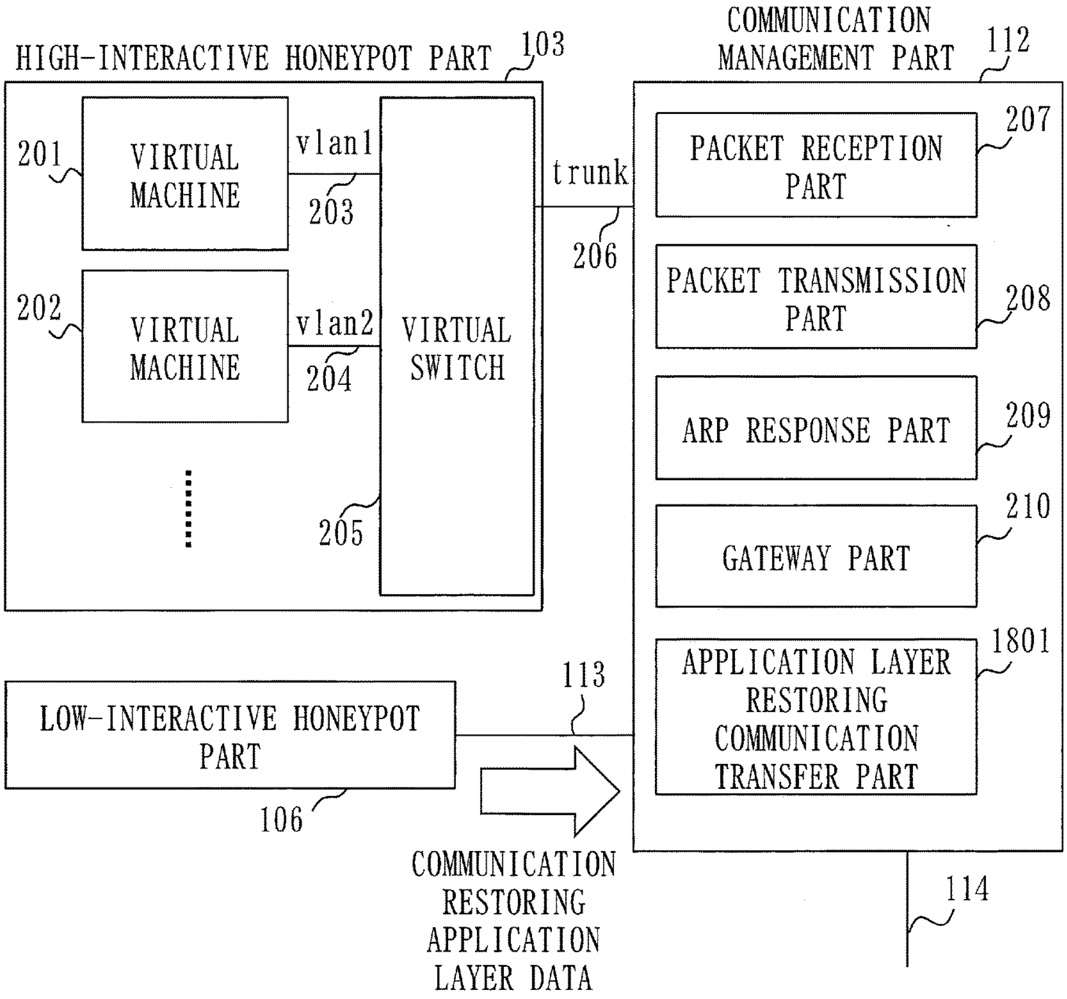
FIG. 18 is a diagram illustrating an example of a system configuration of a periphery of a communication management part 112 according to Embodiment 4.

FIG. 18 is a diagram illustrating an example of a system configuration of a periphery of a communication management part 112 according to Embodiment 4.

Comparison of FIG. 18 with FIG. 2 of Embodiment 1 shows that the communication restoring data accumulation part 211 is no longer used. An application layer restoring communication transfer part 1801 is added which transfers to a virtual machine communication sent from a low-interactive honeypot for restoring the application layer communication state.

Figure 19:
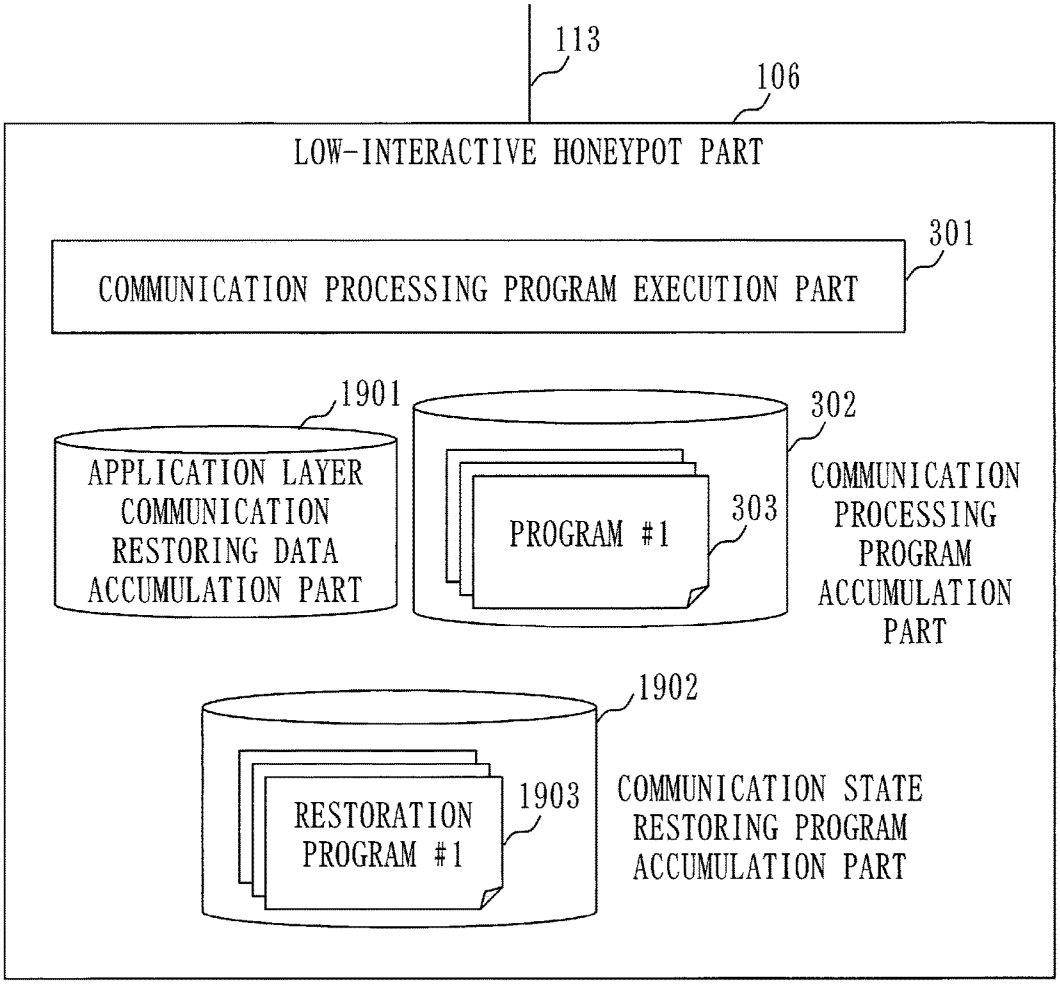
FIG. 19 is a diagram illustrating an example of a configuration of a low-interactive honeypot part 106 according to Embodiment 4.

FIG. 19 is a diagram illustrating an example of a configuration of a low-interactive honeypot part 106 of an attack observation apparatus according to Embodiment 4.

Comparison of FIG. 19 with FIG. 3 illustrating the configuration of the low-interactive honeypot part 106 of Embodiment 1 shows that an application layer communication restoring data accumulation part 1901 for accumulating data for restoring application layer communication and a communication state restoring program accumulation part 1902 for accumulating a restoration program 1903 for restoring communication of the application layer are added.

An operation of the attack observation apparatus according to Embodiment 4 will be described. In Embodiment 4, the low-interactive honeypot part 106 operates in a manner illustrated in FIG. 20.

Figure 20:
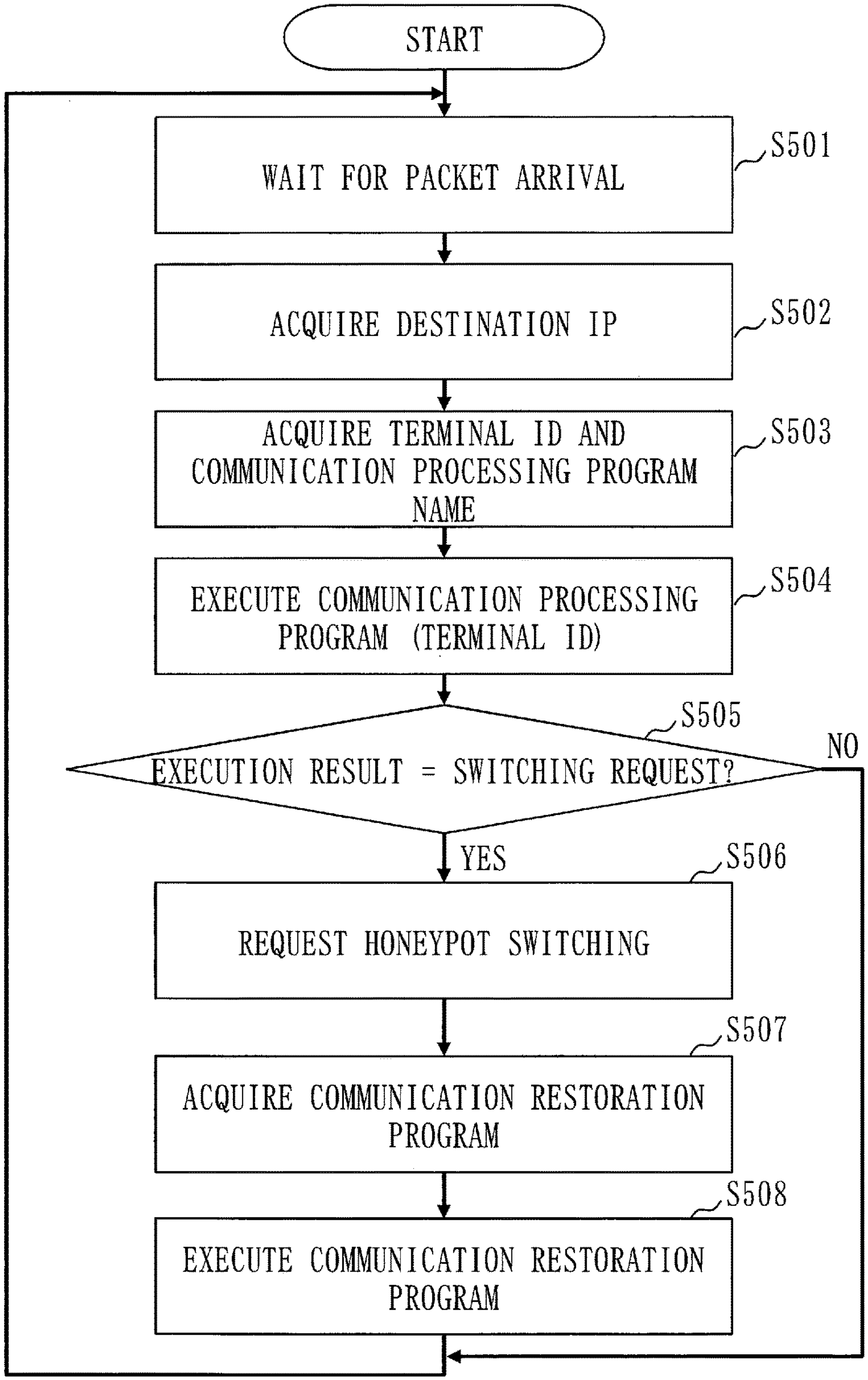
FIG. 20 is a flowchart illustrating an operation flow of the low-interactive honeypot part 106 according to Embodiment 4.

FIG. 20 is a flowchart illustrating an operation flow of the low-interactive honeypot part 106 according to Embodiment 4.

The flowchart of FIG. 20 is the same as that in Embodiment 1 until step S506.

After a honeypot switching request is executed in step S506, a communication restoration program is acquired in step S507. Using this program, the communication state of the application layer is restored in step S508.

Figure 21:
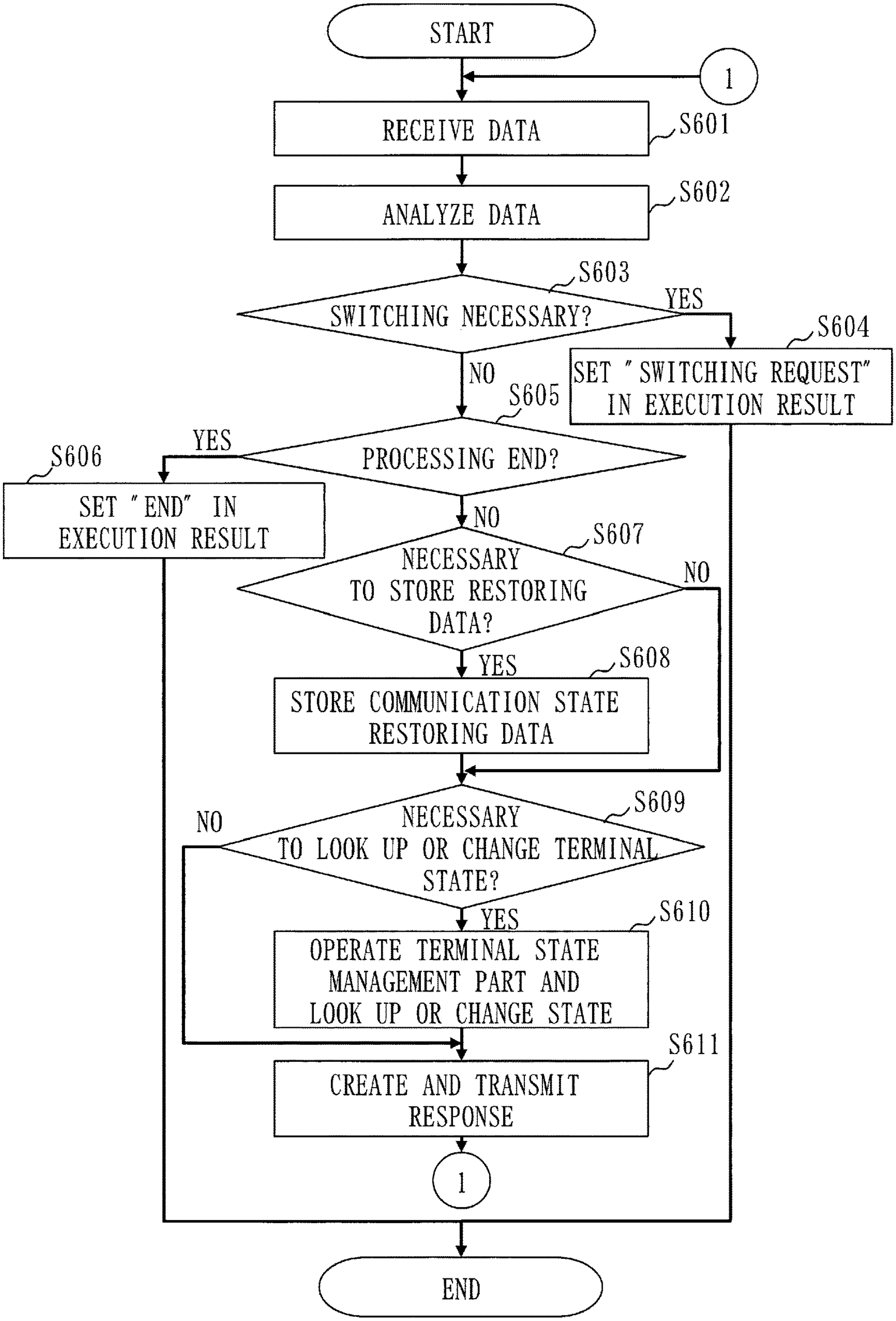
FIG. 21 is a flowchart illustrating an operation flow of a communication processing program according to Embodiment 4.

In order to accumulate data necessary for restoring the communication state of the application layer in step S508, a communication processing program in Embodiment 4 operates as indicated by the flowchart illustrated in FIG. 21.

FIG. 21 is a flowchart illustrating an operation flow of the communication processing program according to Embodiment 4.

The flowchart of FIG. 21 is equivalent to the flowchart indicated in Embodiment 1 but additionally includes step S607 and step S608. More specifically, a process is added so that necessary data is stored when it is determined in the communication processing program that data need be stored for communication state restoration (for example, when a log-in request on an application layer protocol is received in FIG. 8 of Embodiment 1).

Upon reception of a honeypot switching request, the communication management part 112 boots the virtual machine in the same manner as in Embodiment 1, and restores low-level layer communication (for example, TCP, TLS session, and so on). After that, communication restoring application layer data being transmitted from a communication restoration program in a low-interactive honeypot is transferred to a virtual machine on the restored communication connection. Likewise, a response from the virtual machine is transferred to the communication restoration program. This communication is executed until the communication restoration program ends. Then, communication restoration ends.

As described above, in the invention of Embodiment 4, the communication management part 112 covers as far as to the restoration of a protocol of an application layer such as TCP or TLS, which is not higher than the application layer. The communication state restoration of the application layer is executed by a communication restoration program on the low-interactive honeypot. This provides an effect that the communication management part 112 will not be influenced by a change in a protocol of the application layer. Apparently, Embodiment 4 is operable on the communication management part 112, as has been described in Embodiment 2.

Embodiment 5

In Embodiments 1 to 4 described above, switching to a high-interactive honeypot takes place in response to a request from a low-interactive honeypot. In Embodiment 5, a case will be described where an intrusion detection system (IDS) is installed in a low-interactive honeypot, or on a network that connects a low-interactive honeypot and the communication management part 112 to each other, and where honeypot switching is effected under the condition that the IDS has detected an attack.

Figure 22:
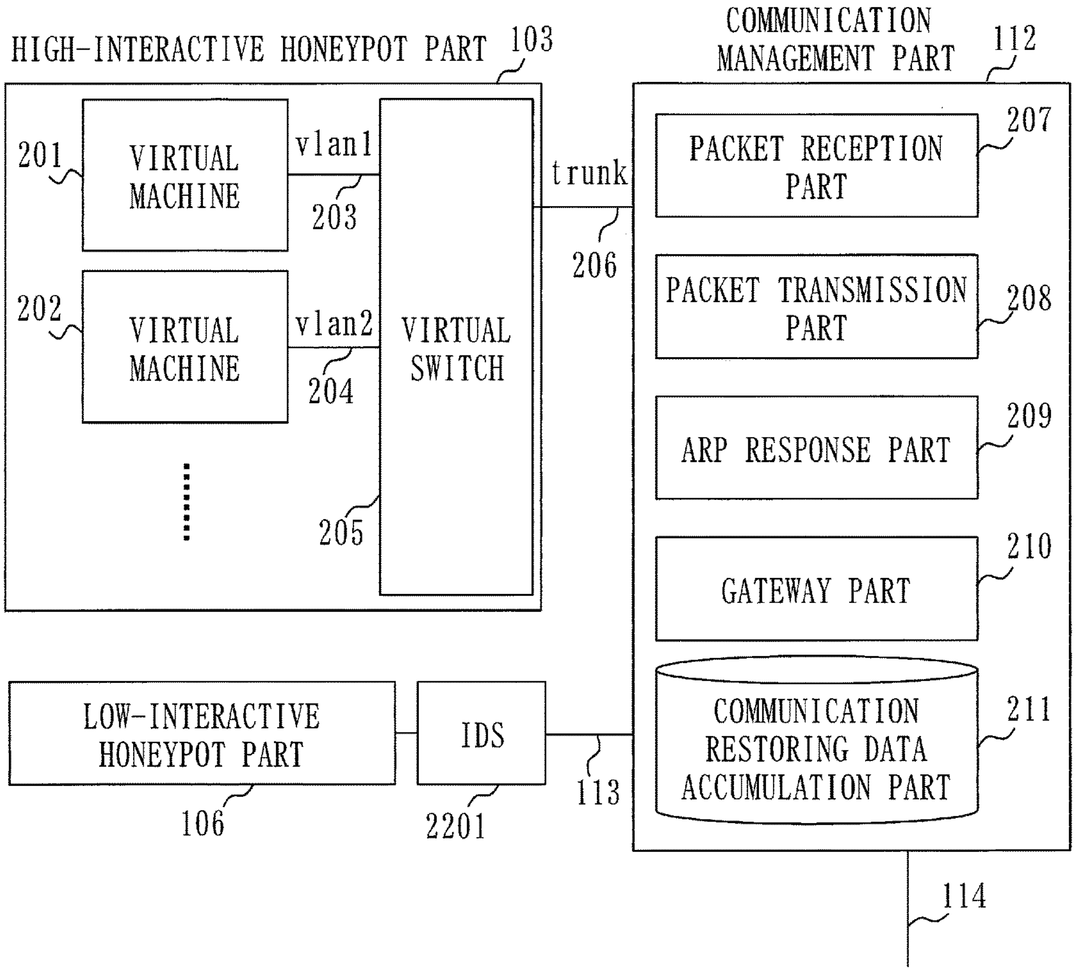
FIG. 22 is a diagram illustrating an example of a system configuration of a periphery of a communication management part 112 according to Embodiment 5.

FIG. 22 is a diagram illustrating an example of a system configuration of a periphery of a communication management part 112 according to Embodiment 5.

Referring to FIG. 22, an IDS 2201 monitors communication to a low-interactive honeypot. When an attack is detected, the attack is notified to the communication management part 112, and switching to a high-interactive honeypot is executed. Switching of the honeypot and communication state restoration after switching are the same as those in Embodiments 1 to 4.

As has been described above, in the invention of Embodiment 5, honeypot switching is effected under the condition that the IDS has detected an attack. Therefore, honeypot switching can be carried out exhaustively, not only when undefined communication arrives but also in response to attacks as a whole which are detectable by an IDS, thus providing an effect that a large-scale system can be simulated more elaborately.

REFERENCE SIGNS LIST

101: honeypot system (attack observation apparatus); 102: external network; 103: high-interactive honeypot part; 104: virtual machines; 105: virtual machine execution environment; 106: low-interactive honeypot part; 107: terminal state transition scenario execution part; 108: terminal state management part; 109: terminal state accumulation part; 110: terminal state transition scenario accumulation part; 112: communication management part; 115: honeypot execution state management part; 116: high-interactive honeypot execution command accumulation part; 201 to 202: virtual machine; 205: virtual switch; 207: packet reception part; 208: packet transmission part; 209: ARP response part; 210: gateway part; 211: communication restoring data accumulation part; 301: communication processing program execution part; 302: communication processing program accumulation part; 303: communication processing program; 701 to 702: virtual machine image; 1501: gateway part cum low-interactive honeypot part; 1601: ARP cache setting part; 1801: application layer restoring communication transfer part; 1901: application layer communication restoring data accumulation part; 1902: communication state restoring program accumulation part; 1903: restoration program; 2201: IDS

The invention claimed is:

1. An attack observation apparatus being an environment where malware is run and an attack of the malware is observed, the attack observation apparatus comprising:

a computer processor; and a memory storing instructions which, when executed by the processor, performs a processing including, using a low-interactive simulation environment to simulate a terminal executing a response to communication coming from the malware;

accumulating, in a terminal state transition scenario storage, a terminal state transition scenario indicating a scenario of a state transition of the terminal;

generating an instruction for changing a state of the simulated terminal, in accordance with the terminal state transition scenario accumulated in the terminal state transition scenario storage;

changing the state of the simulated terminal, in accordance with the generated instruction;

monitoring an execution state of the low-interactive simulation environment with respect to the communication coming from the malware;

switching from the use of the low-interactive simulation environment to a high-interactive simulation environment to simulate the terminal executing a response to the communication coming from the malware depending on the execution state of the low-interactive simulation environment, the high-interactive simulation environment being implemented by using a virtual machine to simulate the terminal; and accumulating, in a communication restoring data accumulation storage, restoring data necessary for restoring a communication state of the simulated terminal, wherein the communication state of the simulated terminal is restored by using the restoring data accumulated in the communication restoring data accumulation storage when the switching of the simulation environment simulating the terminal executing the response to the communication coming from the malware from the low-interactive simulation environment to the high-interactive simulation environment is performed.

2. The attack observation apparatus according to claim 1, wherein the low-interactive simulation environment transmits a switching request for switching the simulation environment which simulates the terminal executing the response to the communication coming from the malware from the low-interactive simulation environment to the high-interactive simulation environment, depending on the execution state of the low-interactive simulation environment, and wherein the switching of the simulation environment simulating the terminal executing the response to the communication coming from the malware from the low-interactive simulation environment to the high-interactive simulation environment is performed in response to the switching request transmitted from the low-interactive simulation environment.

3. The attack observation apparatus according to claim 1, the process further comprising storing, in an execution state management storage, execution state data indicating the execution state of the low-interactive simulation environment and an execution state of the high-interactive simulation environment, wherein the switching of the simulation environment simulating the terminal executing the response to the communication coming from the malware from the low-interactive simulation environment to the high-interactive simulation environment is performed based on an execution state indicated by the execution state data stored in the execution state management storage.

4. The attack observation apparatus according to claim 1, the process further comprising accumulating, in an execution command accumulation storage, a command for executing the terminal state transition scenario on the high-interactive simulation environment, wherein the instruction is generated by using the command accumulated in the execution command accumulation part.

5. The attack observation apparatus according to claim 1, the process further comprising relaying communication coming from the simulated terminal to another terminal simulated by the attack observation apparatus.

6. The attack observation apparatus according to claim 1, the process further comprising storing, in an ARP cache setting storage, an ARP cache as a setting of a spoofed response to an ARP (Address Resolution Protocol) request, wherein the ARP cache stored in the ARP cache setting storage is transmitted to the virtual machine of the high-interactive simulation environment.

7. The attack observation apparatus according to claim 1, the process further comprising producing, from the low-interactive simulation environment, communication restoring application layer data in which a communication state of an application layer of the terminal has been restored, and transferring the communication restoring application layer data to the virtual machine of the high-interactive simulation environment.

8. The attack observation apparatus according to claim 1, wherein the switching of the simulation environment simulating the terminal executing the response to the communication coming from the malware from the low-interactive simulation environment to the high-interactive simulation environment is performed depending on a detection result of an intrusion detection system which detects intrusion of the malware.

9. An attack observation method of an attack observation apparatus being an environment where malware is run and an attack of the malware is observed, the attack observation method comprising:

using a low-interactive simulation environment to simulate a terminal executing a response to communication coming from the malware;

generating an instruction for changing a state of the terminal, in accordance with a terminal state transition scenario indicating a scenario of a state transition of the terminal;

changing the state of the simulated terminal, in accordance with the instruction;

monitoring an execution state of the low-interactive simulation environment with respect to the communication coming from the malware;

switching from the use of the low-interactive simulation environment to a high-interactive simulation environment to simulate the terminal executing a response to the communication coming from the malware depending on the execution state of the low-interactive simulation environment, the high-interactive simulation environment being implemented by using a virtual machine to simulate the terminal; and accumulating, in a communication restoring data accumulation storage, restoring data necessary for restoring a communication state of the simulated terminal, wherein the communication state of the simulated terminal is restored by using the restoring data accumulated in the communication restoring data accumulation storage when the switching of the simulation environment simulating the terminal executing the response to the communication coming from the malware from the low-interactive simulation environment to the high-interactive simulation environment is performed.

* * * * *